US009872334B2

(12) United States Patent
Jha et al.

(10) Patent No.: US 9,872,334 B2
(45) Date of Patent: Jan. 16, 2018

(54) DISCONTINUOUS RECEPTION ALIGNMENT IN DUAL CONNECTIVITY NETWORKS

(71) Applicant: Intel Corporation, Santa Clara, CA (US)

(72) Inventors: Satish Chandra Jha, Hillsboro, OR (US); Ali T. Koc, Portland, OR (US); Kathiravetpillai Sivanesan, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 14/528,755

(22) Filed: Oct. 30, 2014

(65) Prior Publication Data

US 2015/0215912 A1  Jul. 30, 2015

Related U.S. Application Data

(60) Provisional application No. 61/933,862, filed on Jan. 30, 2014.

(51) Int. Cl.
*H04W 52/02* (2009.01)
*H04W 76/04* (2009.01)
(Continued)

(52) U.S. Cl.
CPC ......... *H04W 76/048* (2013.01); *H04L 5/0091* (2013.01); *H04W 52/0212* (2013.01);
(Continued)

(58) Field of Classification Search
CPC ............. H04W 76/048; H04W 72/042; H04W 52/0216; H04W 76/046; H04W 24/00; H04W 28/06; H04W 36/28
(Continued)

(56) References Cited

U.S. PATENT DOCUMENTS 8,295,240 B2 * 10/2012 Suzuki ................ H04W 72/042
370/329
8,867,442 B2 * 10/2014 Pelletier .............. H04W 76/048
370/328
(Continued)

*Primary Examiner* — Sai Aung
(74) *Attorney, Agent, or Firm* — Schwegman Lundberg & Woessner, P.A.

(57) ABSTRACT

A 3GPP LTE protocol enhancement realizes the full benefit of discontinuous reception (DRX) in Long Term Evolution networks by coordinating and aligning DRX operations for conserving power and timing overhead. A dual connectivity enabled User Equipment (UE) comprising a processor and transceiver is configured to align DRX configuration between counterpart Evolved Node Bs (eNB)s, wherein counterpart eNBs are a Master eNB (MeNB) and a Secondary eNB (SeNB) simultaneously connected to the UE, communicate system frame timing and system frame number (SFN) information between the counterpart eNBs, align DRX start offset (drxStartOffset) values for the counterpart eNBs according to the communicated system frame timing and SFN information to compensate for offsets in system frame timing, and allow the start of a DRX ON duration at specific frame or sub-frame times determined by the drxStartOffset values, after the expiration of a DRX inactivity timer.

23 Claims, 7 Drawing Sheets

(51) Int. Cl.
*H04L 5/00* (2006.01)
*H04W 76/02* (2009.01)
*H04W 88/06* (2009.01)

(52) U.S. Cl.
CPC ...... *H04W 52/0216* (2013.01); *H04W 76/025* (2013.01); *H04W 88/06* (2013.01); *Y02B 60/50* (2013.01)

(58) Field of Classification Search
USPC .......................................... 370/329, 311, 328
See application file for complete search history.

(56) References Cited

U.S. PATENT DOCUMENTS

| | | | | |
|---|---|---|---|---|
| 2008/0267105 | A1* | 10/2008 | Wang | H04W 52/0225 370/311 |
| 2011/0002281 | A1* | 1/2011 | Terry | H04W 52/0216 370/329 |
| 2011/0188428 | A1* | 8/2011 | Ishii | H04W 72/04 370/311 |
| 2011/0294491 | A1* | 12/2011 | Fong | H04L 5/001 455/422.1 |
| 2014/0056243 | A1* | 2/2014 | Pelletier | H04W 74/04 370/329 |
| 2014/0112271 | A1* | 4/2014 | Pan | H04W 76/023 370/329 |

\* cited by examiner

DISCONTINUOUS RECEPTION ALIGNMENT IN DUAL CONNECTIVITY NETWORKS

PRIORITY CLAIM

The present Application for Patent claims the benefit of priority under 35 U.S.C. 119(e) to U.S. Provisional Patent Application Ser. No. 61/933,862, entitled "UE ASSISTED TIME SYNCHRONIZATION BETWEEN SENB AND MENB DUE TO SFN OFFSET TO ACHIEVE DRX ALIGNMENT IN LTE DUAL CONNECTIVITY ARCHITECTURE," filed Jan. 30, 2014, which is incorporated herein by reference in its entirety.

TECHNICAL FIELD

Examples generally relate to Long Term Evolution (LTE) networks. One or more examples relate to the implementation of Discontinuous Reception (DRX) alignment in LTE dual connectivity network architecture(s).

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Dual connectivity is a new innovative network architecture that allows a User Equipment (UE) to connect with more than one base station and/or network cell simultaneously. The UE can connect with a Master Cell Group (MCG) and as Secondary Cell Group (SCG) at the same time by connecting to a Master Evolved Node B (MeNB) and a Secondary Evolved Node B (SeNB) at the MCG and SCG respectively. The simultaneously connected MeNB and the SeNB are counterparts in DRX operations. Because the MeNB and SeNB have separate and independent DRX operations for Dual Connectivity enabled UEs, the UE may remain active (i.e., wasting power and signaling resources) longer than necessary if these DRX operations are not aligned. Thus, in order to realize the full benefit of proposed dual connectivity networks, there is now a need for enhancements in current 3GPP LTE standards to coordinate and align DRX operations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
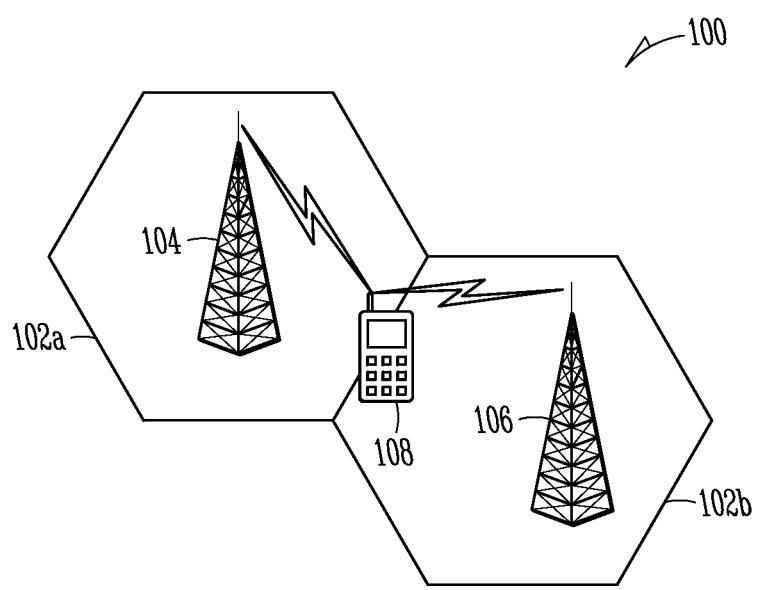
FIG. 1 shows a high level block diagram illustrating an example of dual connectivity in a cellular network, according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refer to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a User Equipment (UE), a wireless communication device or some other similar terminology known in the art. Dual Connectivity in wireless cellular networks has been approved by standards bodies for 3rd Generation Partnership Project (3GPP) LTE advanced releases. Dual connectivity allows a UE to simultaneously connect with more than one cell or eNB. A UE may simultaneously connect to a MeNB and a SeNB.

The 3GPPP standards body has agreed that the MeNB and SeNB support separate and independent DRX operations for a Dual Connectivity UE. However, independent DRX operations may result in the UE over consuming resources such as the UE's battery power by causing the UE to unnecessarily maintain an active state when dual DRX operations are not aligned.

Dual connectivity MeNBs and SeNBs are not co-located. Therefore, their System Frame Numbers (SFNs) (i.e., system frame timings) are not synchronized or aligned. As a result, even if a MeNB and a SeNB have identical DRX configuration parameters, alignment (i.e., a simultaneous start of their DRX ON Durations) is not guaranteed. Unfortunately, current 3GPP LTE specifications do not provide signaling and protocol support for power saving DRX alignment or eNB coordination of DRX configurations.

A method and apparatus for DRX alignment are disclosed in FIGS. 1-7. Coordinated DRX start offsets (drxStartOffsets) are determined to compensate for the offset between SFNs of the SeNB and the MeNB. A mechanism for informing the counterpart MeNB and the SeNB of each other's system frame timings at least at the sub-frame level of granularity, or SFNs, is provided for determining the offset, as well as befitting other LTE dual connectivity operations. DRX configuration parameters are negotiated between the counterpart MeNB and the SeNB over their X2 interfaces to align the DRX configuration. For example, the MeNB and the SeNB may select equal DRX ON Durations and equal (or integer multiple) DRX Long cycles. The start of DRX ON Duration is determined by the drxStartOffset, which allows the start of DRX On duration only at specific frames and/or sub-frames after expiration of a DRX inactivity timer.

FIG. 1 shows a high level block diagram illustrating an example of dual connectivity in a cellular network 100. Cell 102a, belonging to a MCG, comprises MeNB 104. Cell 102b, belonging to a SCG, comprises SeNB 106. UE 108 is simultaneously connected to MeNB 104 and SeNB 106. MeNB 104 and SeNB 106 may communicate via an X2 interface protocol.

Figure 2:
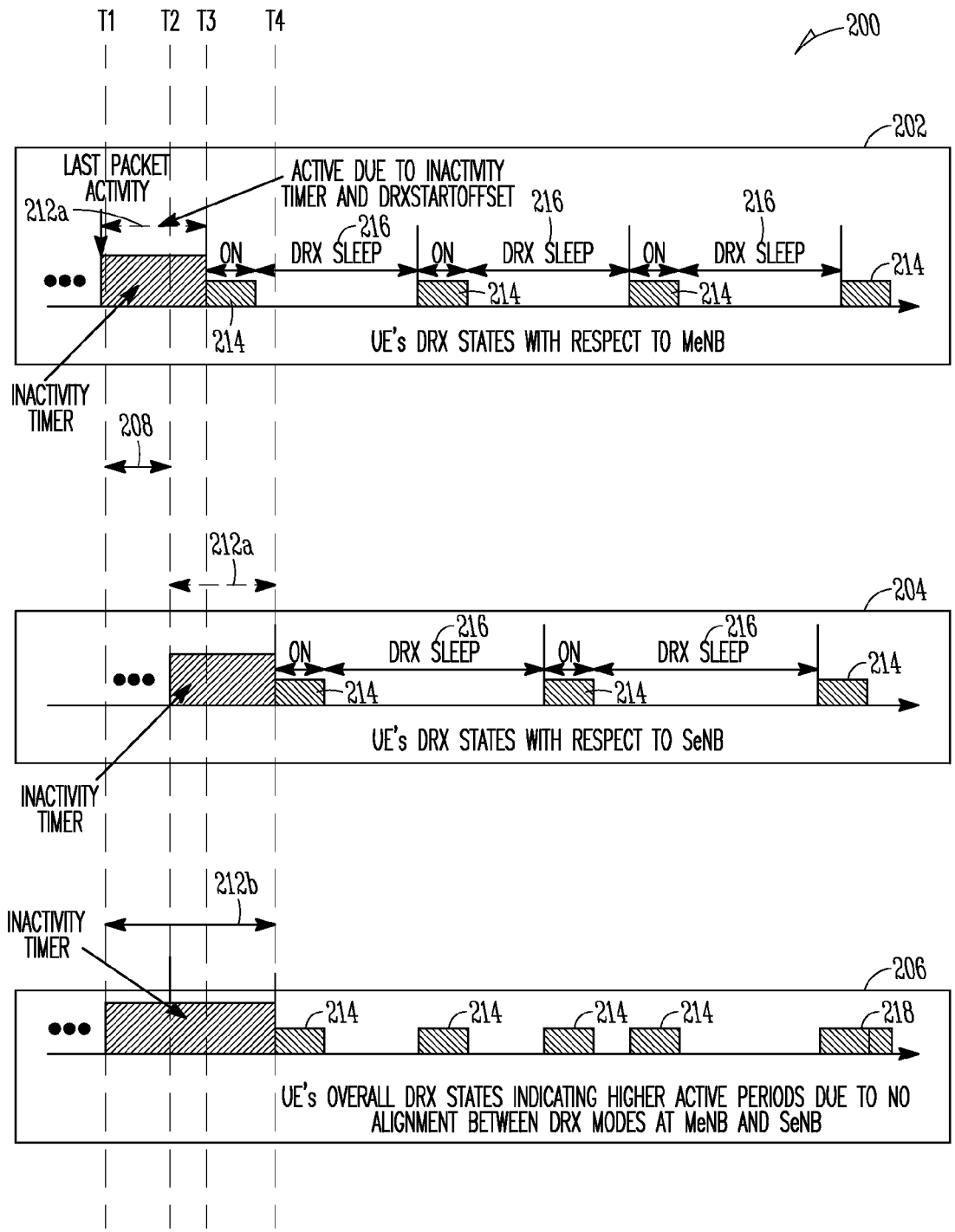
FIG. 2 illustrates the effect of unaligned DRX at a UE, according to some embodiments.

FIG. 2 illustrates the effect of unaligned DRX at a UE 200. Independent and unaligned DRX operations performed by MeNB 104 and SeNB 106 may increase the UE's 108 overall active state durations and concomitant UE 108 power consumption. As shown, UE 108 supports operational states for DRX communications from a MeNB 202 and a SeNB 204, resulting in overall combined DRX communication states 206.

Active state periods of the UE 108 operation are determined by the expiration of an inactivity timer, the value of DRX cycle and the value of a DRX start offset value "drxStartOffset". The inactivity timer expires after a predetermined amount of time since the last packet activity from the same eNB (i.e., the MeNB 104 and the SeNB 106 each has its own independent packet activity timer). The UE's 108 DRX logic continues to consume signaling and power resources as long as the inactivity timer has not expired. The UE 108 operates in an active state having duration 212a, starting at time T1 and ending at time T3, with respect to the MeNB 104. The UE 108 simultaneously operates in an active state, also having duration 212a, starting at time T2 and ending at time T4, with respect to the SeNB 106.

Following the end of each active state period 212, the UE 108 alternates between ON states 214 where the UE 108 wakes up and looks for packet activity, and a DRX sleep state 216 where the UE 108 sleeps to conserve the UE's 108 battery power. Because the DRX active states from the MeNB 202 and the SeNB 204 are unaligned, the combined active state period for both MeNB 104 and SeNB 106 signals (202 and 204 respectively) has a longer duration 212b, than either of the uncombined active state period durations 212a. The combined ON state period 218 also has a longer duration than either of the uncombined ON state period durations 214. The extended operation of the UE 108 in the combined active state 212b and ON 218 state periods generates wasteful power consumption by the UE 108.

To help prevent unnecessary power consumption by the UE 108, values of drxStartOffset 208 for the MeNB 104 and/or the SeNB 106 need to be aligned to compensate for inherent SFN offsets of the MeNB 104 and the SeNB 106. Without adjusting the drxStartOffsets 208, DRX alignment may not be able to be achieved even when the MeNB 104 and SeNB 106 DRX were identically configured.

Figure 3:
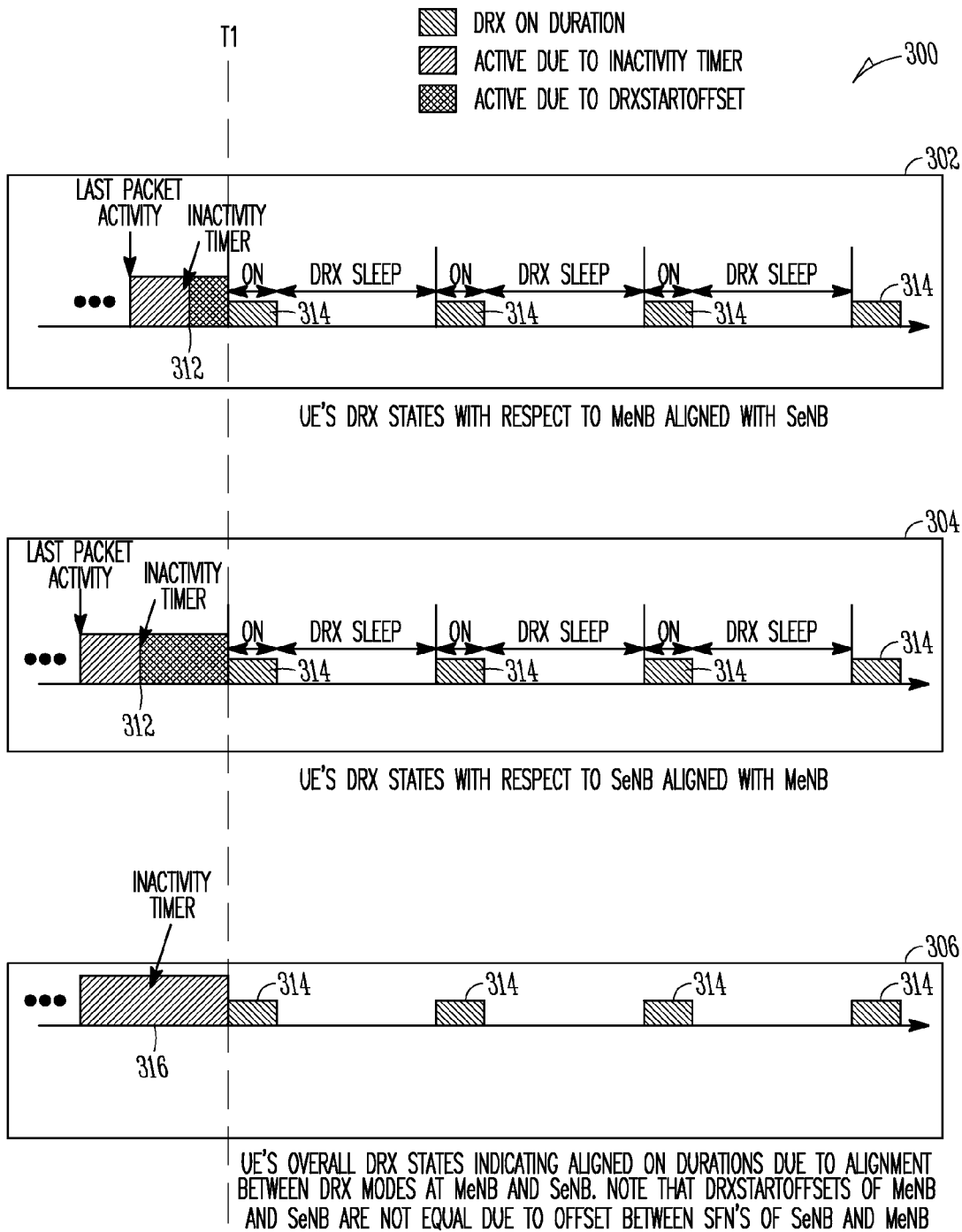
FIG. 3 illustrates DRX alignment at a UE, according to some embodiments.

FIG. 3 illustrates Dual Connection DRX alignment 300 at a UE. The UE 108 supports operational states for DRX communications from a MeNB 302 and a SeNB 304, resulting in overall combined DRX communication states 306.

DRX alignment decreases a UE's 108 overall active state 312 and ON state 314 durations as shown in FIG. 3. To maximize user power savings during DRX operations in Dual Connection network architectures where a UE 108 may have separate and independent DRX operations for a MeNB 104 and a SeNB 106, the total combined active state 316 and ON state 314 state durations of the UE 108 may be minimized. The total combined active state 316 and ON 314 state durations are minimized when UE 108 DRX ON state durations 314 are aligned with respect to the MeNB 104 and the SeNB 106.

MeNB 104 and SeNB 106 DRX activity state 312 and ON 314 state durations are aligned to time T1 using correctly calculated drxStartOffsets. The correct drxStartOffsets ensure that all following combined ON state durations 314 occur simultaneously in time 306. The combined activity and ON states 306 cannot overlap or have the extended durations seen in FIG. 2.

To align the DRX ON state durations 314, drxStartOffsets for the MeNB 104 and the SeNB 106 are calculated to compensate for SFN timing offsets between the SeNB 106 and the MeNB 104. However, for calculating the drxStartOffsets, the MeNB 104 and the SeNB 106 should have knowledge of each other's SFN timings.

Figure 4:
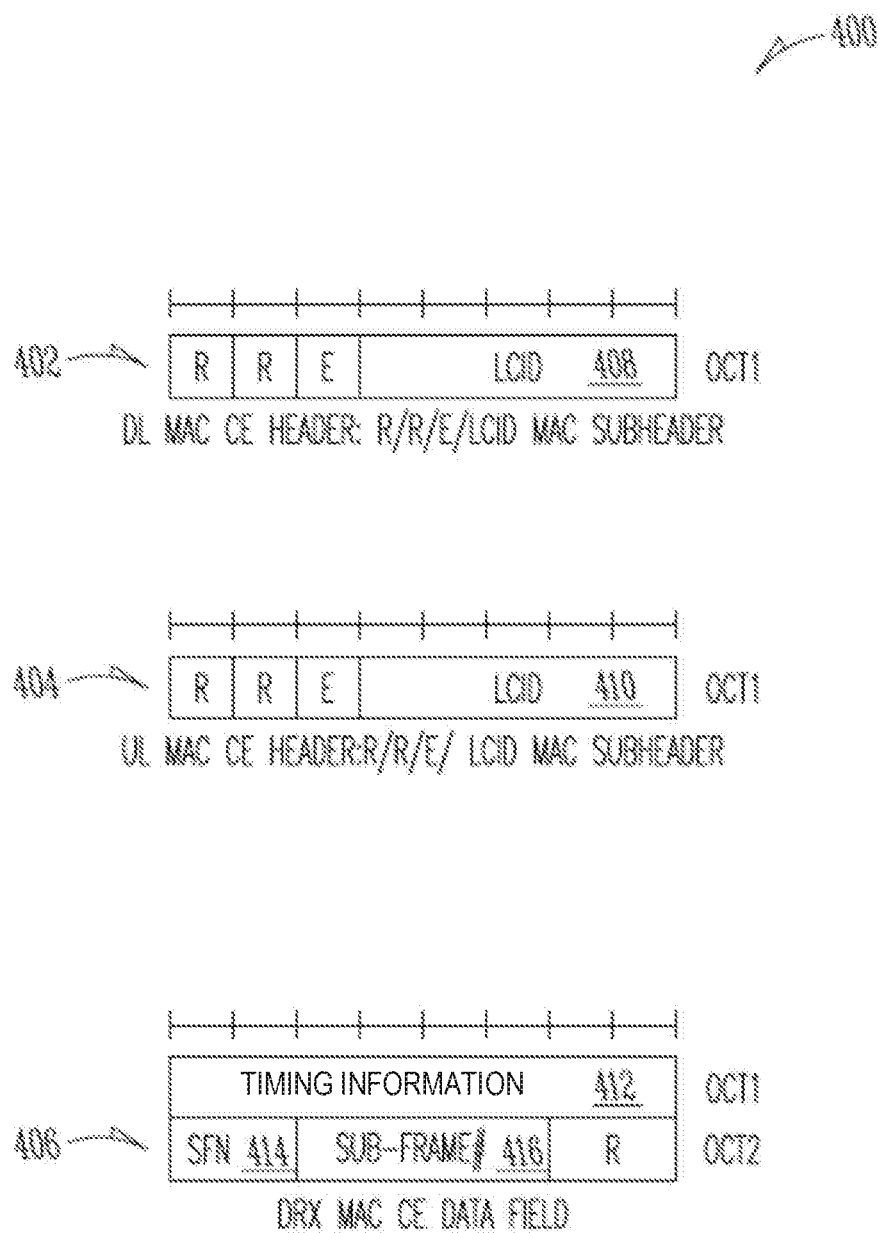
FIG. 4 illustrates a Medium Access Control (MAC) Element for DRX alignment between a MeNB and a SeNB, according to some embodiments.
Figure 5:
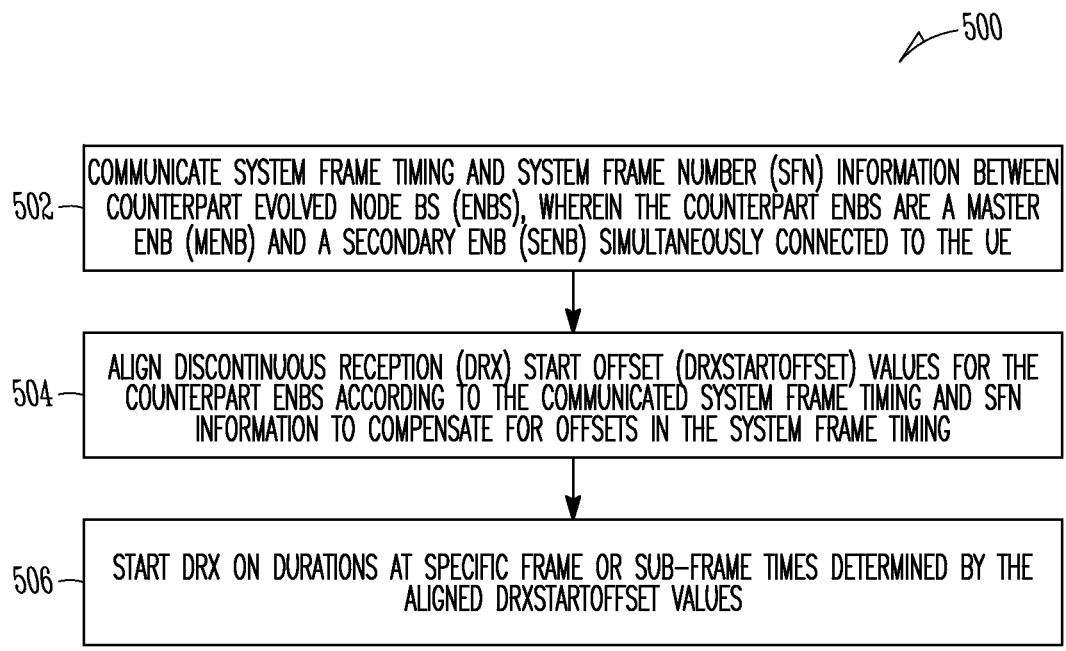
FIG. 5 is a high level overview flowchart of DRX Alignment in Dual Connectivity Networks, according to some embodiments.

A dual connected UE 108 is aware of system frame timings and SFNs of both connected eNBs (i.e., the MeNB 104 and the SeNB 106). In one UE 108 assisted embodiment, an eNB (104 or 106) can instruct the UE 108 to transmit the system frame timing and SFN information of its counterpart dual connected eNB (104 or 106) for calculating drxStartOffsets. In another UE 108 unassisted embodiment, signaling messages having system frame timing and SFN information are exchanged over an X2 interface directly between the MeNB 104 and the SeNB 106 for calculating drxStartOffsets. FIG. 4 details novel MAC Control Element (CE) data structures for UE 108 assisted alignment. FIG. 5 details a messaging mechanism for acquiring system frame timing and SFN information of a counterpart eNB in Dual Connectivity over the X2 interface.

FIG. 4 illustrates MAC Control Element components 400 for UE 108 assisted DRX alignment between a MeNB 104 and a SeNB 106. The MeNB 104 and/or SeNB 106 should have knowledge of the system frame timing and SFN of its counterpart eNB to align the DRX operations for a Dual Connection capable UE 108. LTE network architectures comprise a SFN, between 0 and 1023, that is updated every 10 milliseconds (ms), and a sub-frame number (SF) between 0 and 9 that is updated every 1 ms.

In a UE 108 assisted embodiment, a SFN used to calculate a drxStartOffset value for starting DRX operations is broadcast to a UE 108 by an eNB in a Master Information Block (MIB) message, which the UE 108 can forward to the counterpart eNB. Because a dual connected UE 108 is synchronized to, and aware of, the system frame timing and SFN of both of the MeNB 104 and SeNB 106, the MeNB 104 (or the SeNB 106) can ask the UE 108 to send the system frame timing and SFN information of its counterpart eNB over the air interface for the purpose of DRX alignment as well as other dual connectivity needs. Either the MeNB 104 or the SeNB 106 can initiate this approach to obtain the system frame timing and SFN information of the other eNB.

For example, the MeNB 104 can transmit a novel downlink (DL) MAC Control Element (CE) to a dual connectivity UE 108 for requesting the system frame timing and SFN information of its counterpart SeNB 106. The UE 108 may reply by returning a novel Uplink (UL) MAC CE containing the requested system frame timing and SFN information. Novel CE data structures for exchanging system frame timing and SFN information of counterpart eNBs via UL and DL are detailed below.

In various embodiments, novel Radio Resource Control (RRC) messages, or a novel Information Element (IE) included in the existing RRC message structure, are defined to enable the UE 108 assisted embodiments to acquire system frame timing and SFN information of a counterpart eNB in Dual Connectivity network architectures. In one embodiment, a novel DL MAC CE is used by an eNB to request a Dual Connectivity enabled UE 108 to transmit system frame timing and SFN information of its counterpart eNB. The DL MAC CE comprises a DL MAC CE sub-header 402 having a Logical Channel Identifier (LCID) 408 selected from the reserved LCID pool for Downlink Shared Channel (DL-SCH) used to identify the DL MAC CE for requesting counterpart system frame information. The DL MAC CE header 102 has no (or zero byte) data field.

Likewise, a novel UL MAC CE is used by a Dual Connectivity enabled UE 108 to respond to the request for counterpart eNB system frame timing and SFN information. The UL MAC CE comprises a UL MAC CE sub-header 404 having a Logical Channel Identifier (LCID) 410 selected from the reserved LCID pool for UL Shared Channel (UL-SCH) used to identify the UL MAC CE for responding to requests for counterpart system frame information and a MAC CE data field 406.

The MAC CE data field 406 carries the system frame timing information 412 of the counterpart eNB. The system frame timing information 412 comprises a SFN value 414, as well as sub-frame number value 416 of the counterpart eNB.

In other direct embodiments, messages having system frame timing and SFN information are exchanged over an X2 interface directly between the MeNB 104 and the SeNB 106 for calculating drxStartOffsets. Either eNB may ask its counterpart eNB to reply with system frame timing and SFN information. In reply, the counterpart eNB responds with system frame timing and SFN information with the absolute system time stamp. An absolute system time stamp compensates for non-ideal backhaul delays of up to several ms.

In dual connectivity, RRC messages carrying DRX configuration IEs for the MeNB 104 and the SeNB 106 are transmitted by the MeNB 104. The SeNB 106 sends its DRX configuration IE to its counterpart MeNB 104 over the X2 interface, such that it can be forwarded to the UE 108. A new system timing IE may be added to the existing SeNB 106 DRX configuration IE comprising system frame timing and SFN information stamped with absolute system time. This system timing IE is not forwarded to the UE 108 by the MeNB 104 because it is primarily used by the MeNB 104 to adjust the MeNB 104 drxStartOffset in order to align its DRX Configuration with that of the SeNB 106 and to ensure correct alignment of DRX operations of dual connectivity UEs 108.

FIG. 5 is a high level overview flowchart of DRX Alignment in Dual Connectivity Networks 500. Beginning in operation 502, system timing information is exchanged between the MeNB 104 and the SeNB 106. DRX configuration parameters are negotiated between the MeNB 104 and the SeNB 106, either over their X2 interfaces or relayed by the UE 108, for aligning the DRX configuration. System frame timing and SFN information is communicated between the counterpart eNBs. The information may be requested by either the MeNB 104 or the SeNB 106 and relayed through the UE 108 by the counterpart eNB, or either eNB may request the information directly from its counterpart eNB via their X2 interface.

Thus, system frame timing and SFN information is communicated between counterpart eNBs, wherein the counterpart eNBs are a MeNB and a Secondary SeNB simultaneously connected to the UE. Control proceeds to operation 504

In operation 504, DRX timing is aligned. DRX start offset (drxStartOffset) values for the counterpart eNBs are aligned according to the communicated system frame timing and SFN information in order to compensate for offsets in the system frame timing. The start of DRX ON Duration periods is determined by the drxStartOffset value. For example, the MeNB 104 and the SeNB 106 may select equal DRX ON durations and equal (or integer multiple) DRX Long cycles. Control proceeds to operation 506.

After DRX configuration and alignment, the start of DRX On durations are allowed at specific frame and/or sub-frame times, after expiration of a DRX inactivity timer in operation 506.

Figure 6:
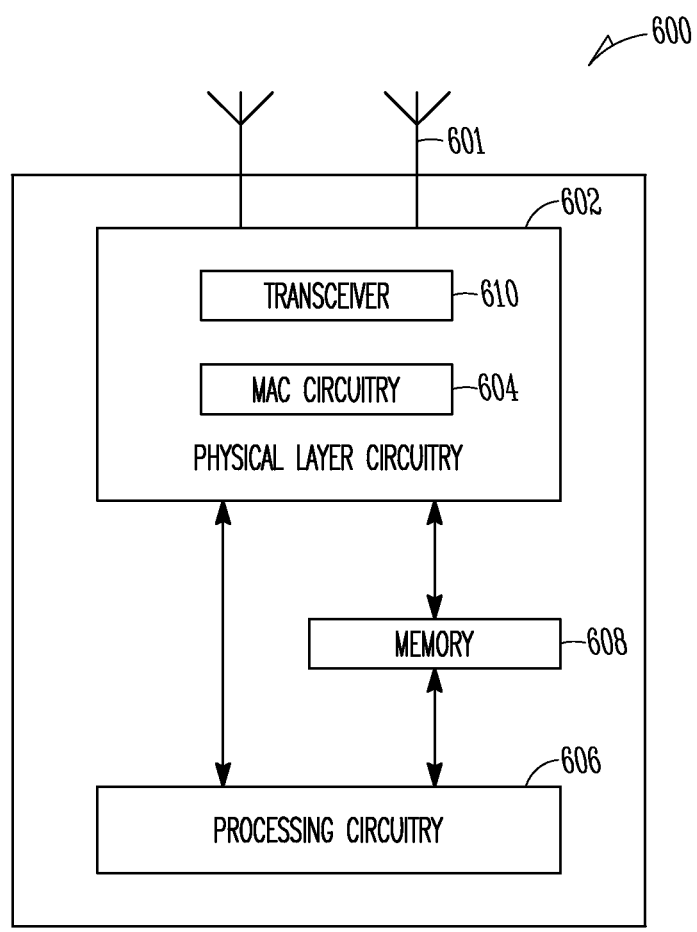
FIG. 6 shows a functional diagram of an exemplary communication station in accordance with some embodiments.

FIG. 6 shows a functional diagram of an exemplary communication station 600 in accordance with some embodiments. In one embodiment, FIG. 6 illustrates a functional block diagram of a communication station that may be suitable for use as a MeNB 104 (FIG. 1) or SeNB 106 (FIG. 1) in accordance with some embodiments. The communication station 600 may also be suitable for use as a handheld device, mobile device, cellular telephone, smartphone, tablet, netbook, wireless terminal, laptop computer, femtocell, HDR subscriber station, access point, access terminal, or other PCS device.

The communication station 600 may include physical layer circuitry 602 having a transceiver 610 for transmitting and receiving signals to and from other communication stations using one or more antennas 601. The communication station 600 may also comprise MAC circuitry 604 for controlling access to the wireless medium. The communication station 600 may also include processing circuitry 606 and memory 608 arranged to perform the operations described herein. In some embodiments, the physical layer circuitry 602 and the processing circuitry 606 may be configured to perform operations detailed in FIG. 5.

In accordance with some embodiments, the MAC circuitry 604 may be arranged to contend for a wireless medium, and configure frames or packets for communicating over the wireless medium and the physical layer circuitry 602 may be arranged to transmit and receive signals. The physical layer circuitry 602 may include circuitry for modulation/demodulation, up-conversion/down-conversion, filtering, amplification, etc. In some embodiments, the processing circuitry 606 of the communication station 600 may include one or more processors. In some embodiments, two or more antennas 601 may be coupled to the physical layer circuitry 602 arranged for sending and receiving signals. The memory 608 may store information for configuring the processing circuitry 606 to perform operations for configuring and transmitting message frames and performing the various operations described herein. The memory 608 may comprise any type of memory, including non-transitory memory, for storing information in a form readable by a machine (e.g., a computer). For example, the memory 608 may comprise a computer-readable storage device, read-only memory (ROM), random-access memory (RAM), magnetic disk storage media, optical storage media, flash-memory devices, and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 600 may include one or more antennas 601. The antennas 601 may comprise one or more directional or omnidirectional antennas, including, for example, dipole antennas, monopole antennas, patch antennas, loop antennas, micro-strip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas 601 may be effectively separated for spatial diversity and the different channel characteristics that may result between each of the antennas 601 and the antennas of a transmitting station.

In some embodiments, the communication station 600 may include one or more of a keyboard, a display, a non-volatile memory port, multiple antennas, a graphics processor, an application processor, speakers, and other mobile device elements. The display may be a Liquid Crystal Display (LCD) screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of the communication station 600 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include Read-Only-Memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory 608.

Figure 7:
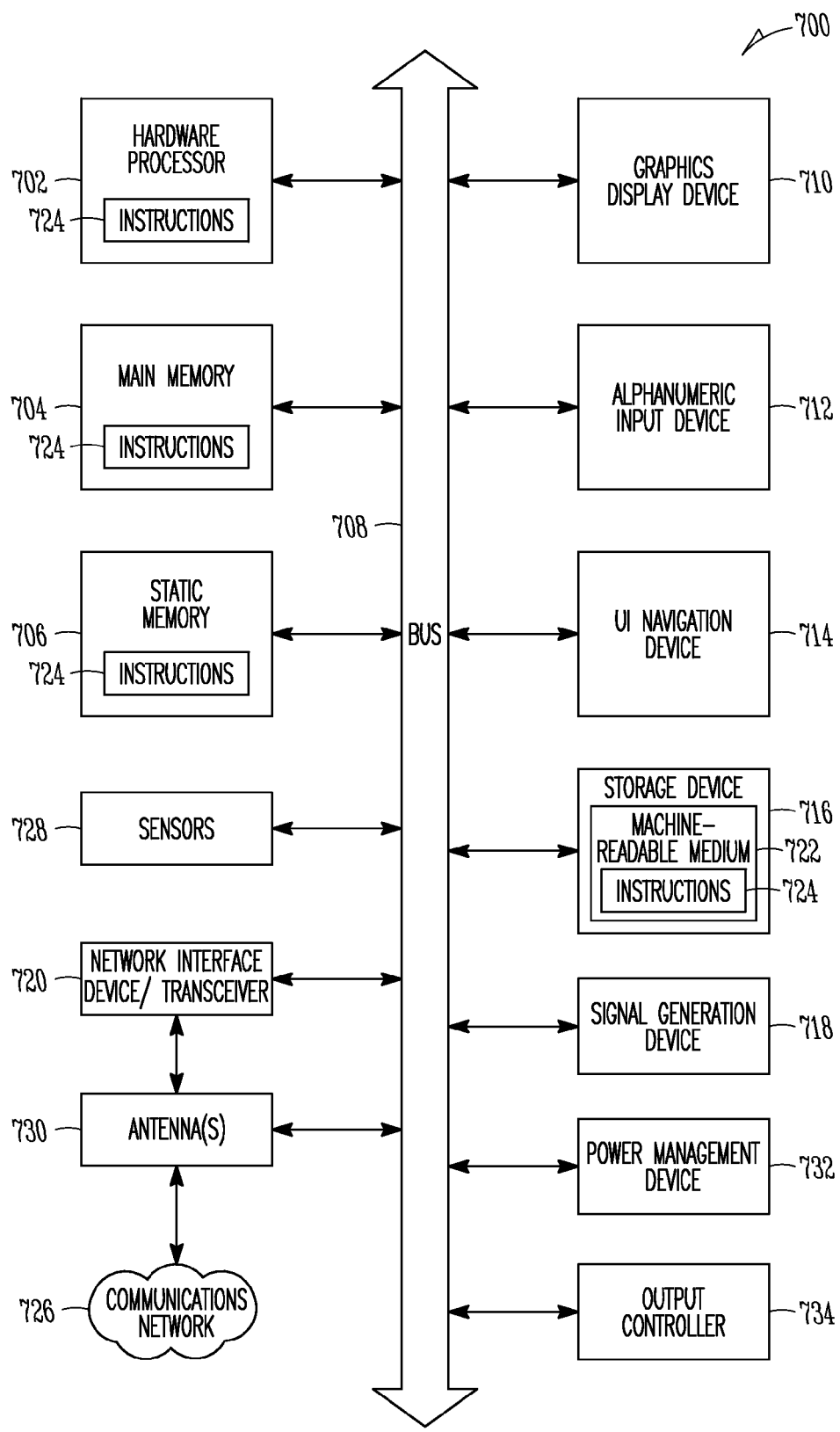
FIG. 7 shows a block diagram of an example of a machine upon which, any of one or more techniques (e.g., methods) discussed herein may be performed.

FIG. 7 illustrates a block diagram of an example of a machine 700 upon which any one or more of the techniques (e.g., methodologies) discussed herein may be performed. In one embodiment, the machine 700 may be a UE 108. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while a single machine 700 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions 724. Non-limiting machine readable medium 722 examples may include solid-state memories, and optical and magnetic media. In an example, a massed machine readable medium comprises a machine readable medium 722 with a plurality of particles having resting mass. Specific examples of massed machine readable media may include: non-volatile memory, such as semiconductor memory devices (e.g., Electrically Programmable Read-Only-Memory (EPROM), or Electrically Erasable Programmable Read-Only-Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks 726 may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas 730 to connect to the communications network 726. In an example, the network interface device/transceiver 720 may include a plurality of antennas 730 to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 724 for execution by the machine 700, and includes digital or analog communications signals or other intangible media to facilitate communication of such software.

What is claimed is:

1. A dual connectivity enabled User Equipment (UE) comprising a processor and transceiver configured to:

communicate system frame timing and system frame number (SFN) information between counterpart evolved Node Bs (eNBs), wherein the counterpart eNBs are a Master eNB (MeNB) and a Secondary eNB (SeNB) simultaneously connected to the UE;

align Discontinuous Reception (DRX) start offset (drxStartOffset) values for the counterpart eNBs according to the system frame timing and SFN information to compensate for offsets in the system frame timing;

start DRX ON durations at specific frame or sub-frame times determined by the aligned drxStartOffset values; and use the aligned DRX start offset values for beginning active state periods when an inactivity timer expires.

2. The UE of claim 1 further configured to receive Radio Resource Control messages carrying DRX configuration Information Elements (IE)s from the counterpart eNBs for aligning DRX configurations, wherein the DRX configuration IEs comprise the system frame timing and SFN information stamped with absolute system time.

3. The UE of claim 1 further configured to support a download (DL) Medium Access Control (MAC) Control Element (CE) comprising a sub-header having a Logical Channel Identifier (LCID) selected from a reserved LCID pool for Downlink Shared Channel (DL-SCH) used to identify the DL MAC CE for communicating the system frame timing and SFN information.

4. The UE of claim 1 further configured to support an uplink (UL) MAC CE comprising a sub-header having a Logical Channel Identifier (LCID) selected from a reserved LCID pool for UL Shared Channel (UL-SCH) used to identify the UL MAC CE for communicating the system frame timing and system frame number information.

5. The UE of claim 1 further configured to operate according to equal DRX ON durations and equal DRX Long cycles.

6. The UE of claim 1 further configured to operate according to integer multiple DRX long cycles.

7. The UE of claim 1 further configured to conserve battery power by using the aligned DRX start offset values to minimize durations of an active state.

8. The UE of claim 1 further configured to align the drxStartOffset values so that the aligned values ensure that MeNB and SeNB active state durations occur simultaneously.

9. The UE of claim 1 further configured to receive instructions from a MeNB or a SeNB to transmit the system frame timing and SFN information of the counterpart MeNB or SeNB for aligning the drxStartOffset values.

10. A non-transitory computer readable storage device including instructions stored thereon, which when executed by one or more processor(s) of a User Equipment (UE), cause the UE to perform operations to:

align discontinuous reception (DRX) configuration between counterpart Evolved Node Bs (eNB)s, wherein the counterpart eNBs are a Master eNB (MeNB) and a Secondary eNB (SeNB) simultaneously connected to the UE;

communicate system frame timing and system rame number (SFN) information between the counterpart eNBs;

align discontinuous reception start offset (drxStartOffset) values for the counterpart eNBs according to the system frame timing and SFN information to compensate for offsets in system frame timing;

start DRX ON durations at specific frame or sub-frame times determined by the aligned drxStartOffset values; and use the aligned drxStartOffset values for beginning active state periods, after the expiration of a DRX inactivity timer.

11. The non-transitory computer readable storage device of claim 10 wherein the operations further configure the UE to receive Radio Resource Control messages carrying DRX configuration Information Elements (IE)s from the counterpart eNBs for aligning DRX configurations, wherein the DRX configuration IEs comprise the system frame timing and SFN information stamped with absolute system time.

12. A method for aligning discontinuous reception (DRX) in a dual connectivity wireless network comprising;
exchanging system frame timing and system frame number (SFN) information between a Master Evolved Node B (MeNB) and a Secondary Evolved Node B (SeNB) simultaneously connected to a User Equipment (UE); and
determining DRX start offset (drxStartOffset) values for the MeNB and the SeNB according to the exchanged system frame timing and SFN information, for initiating aligned packet activity with the UE at specific frame and/or sub-frame times;
wherein the aligned packet activity is associated with DRX ON durations at specific frame or sub-frame times determined by aligned drxStartOffset values for beginning active state periods when an inactivity timer expires.

13. The method of claim 12 wherein the system frame timing and SFN information is exchanged over an X2 interface or relayed by the UE.

14. The method of claim 12 wherein the system frame timing and SFN information is exchanged in a Medium Access Control (MAC) Control Element (CE) comprising data fields for carrying the system frame timing and SFN information.

15. The method of claim 12 wherein the system frame timing and SFN information for determining the drxStartOffset vaules is identified by a unique Logical Channel Identifier (LCID).

16. The method of claim 12 wherein the drxStartOffset values for initiating aligned packet activity are determined by compensating for offsets in system frame timing between the MeNB and the SeNB.

17. The method of claim 12 wherein a system timing Information Element (IE) is added to SeNB configuration parameters, the IE comprising the system frame timing and SFN information stamped with absolute system time.

18. A dual connectivity enabled User Equipment (UE) comprising:
memory configured to store system frame timing and system frame number (SFN) information; and
processing circuitry configured to:
communicate the system frame timing and SFN information between counterpart evolved Node Bs (eNBs), wherein the counterpart eNBs are a Master eNB (MeNB) and a Secondary eNB (SeNB) simultaneously connected to the UE;
align Discontinuous Reception (DRX) start offset (drxStartOffset) values for the counterpart eNBs according to the system frame timing and SFN information to compensate for offsets in the system frame timing;
start DRX ON durations at specific frame or sub-frame times determined by the aligned drxStartOffset values; and
use the aligned DRX start offset values for beginning active state periods when an inactivity timer expires.

19. The UE of claim 18 further configured to receive Radio Resource Control messages carrying DRX configuration Information Elements (IE)s from the counterpart eNBs for aligning DRX configurations, wherein the DRX configuration IEs comprise the system frame timing and SFN information stamped with absolute system time.

20. The UE of claim 18 further configured to support a download (DL) Medium Access Control (MAC) Control Element (CE) comprising a sub-header having a Logical Channel Identifier (LCID) selected from a reserved LCID pool for Downlink Shared Channel (DL-SCH) used to identify the DL MAC CE for communicating the system frame timing and SFN information.

21. The UE of claim 18 further configured to support an uplink (a) MAC CE comprising a sub-header having a Logical Channel Identifier (LCID) selected from a reserved LCID pool for UL Shared Channel (UL-SCH) used to identify the UL MAC CE for communicating the system frame timing and system frame number information.

22. The UE of claim 18 further configured to operate according to equal DRX ON durations and equal DRX Long cycles.

23. The UE of claim 18 further configured to operate according to integer multiple DRX long cycles.

* * * * *

UNITED STATES PATENT AND TRADEMARK OFFICE
CERTIFICATE OF CORRECTION

PATENT NO. : 9,872,334 B2  
APPLICATION NO. : 14/528755  
DATED : January 16, 2018  
INVENTOR(S) : Jha et al.

Page 1 of 1

It is certified that error appears in the above-identified patent and that said Letters Patent is hereby corrected as shown below:

In the Claims

In Column 10, Line 59, in Claim 10, delete "rame" and insert --frame-- therefor

In Column 11, Line 39, in Claim 15, delete "vaules" and insert --values-- therefor In Column 12, Line 35, in Claim 21, delete "(a)" and insert --(UL)-- therefor Signed and Sealed this  
Twenty-eighth Day of May, 2019

Andrei Iancu  
*Director of the United States Patent and Trademark Office*